Jan. 24, 1956  R. W. DODSON ET AL  2,732,072
FILTERING APPARATUS

Filed March 14, 1950  2 Sheets-Sheet 1

WITNESSES:
Ralph Cobb Smith
Kermith F. Ross

INVENTORS.
Richard W. Dodson
Gerhart Friedlander
Lindsay Helmholz
Peter H. Watkins
BY
Roland A. Anderson
Attorney Jan. 24, 1956  R. W. DODSON ET AL  2,732,072
FILTERING APPARATUS Filed March 14, 1950  2 Sheets-Sheet 2

WITNESSES:

INVENTORS.
Richard W. Dodson
Gerhart Friedlander
Lindsay Helmholz
Peter H. Watkins
BY

United States Patent Office 2,732,072
Patented Jan. 24, 1956

2,732,072

FILTERING APPARATUS

Richard W. Dodson, Patchogue, and Gerhart Friedlander, Bluepoint, N. Y., Lindsay Helmholz, St. Louis, Mo., and Peter H. Watkins, Cambria, Va., assignors to the United States of America as represented by the United States Atomic Energy Commission Application March 14, 1950, Serial No. 149,516

3 Claims. (Cl. 210—62)

This invention relates to a filtering apparatus and, more particularly, it relates to a remote-control filtering apparatus.

In certain filtering operations, such as those in which radioactive substances or toxic liquids must be handled, it is important that the filtering apparatus used be so constructed as to permit the necessary manipulations to be formed by remote control so that operating personnel can be adequately shielded from the harmful radiations or toxic fumes present in the area in which the filtrations are carried out. This is especially true in the case of precipitations and filtrations required for the isolation or separation of radio-active materials, which must be carried out in a receptacle substantially surrounded by lead or other shielding material. Further, it is highly advantageous in the case of this type of material, where a minimum amount of handling is desirable, if the material can be separated in the shipping container.

It is, therefore, an object of this invention to provide an apparatus for filtering by remote control.

It is another object of this invention to provide a remote control filtering apparatus which permits the filtration of radioactive substances without removal from the shipping container.

When the apparatus of the invention in its preferred embodiment is assembled for operation in the shielding container, it comprises an outer container, preferably the shipping receptacle, for holding the slurry to be filtered and a detachable filtering unit mounted concentrically therein. The filtering unit carries the filtering element itself, ingredient reservoirs with inlet conduits, a pressure conduit, a slurry conduit and a filtrate conduit. When the filtering unit is placed in the outer container, the inlet conduits of the reservoirs communicate with the outer container, the slurry conduit is positioned to deliver slurry from the outer container to the filtering element and the filtrate conduit is positioned to deliver filtrate from the filtering element back into the outer container.

It is an important feature of the invention that the filtering unit, including all conduits, is detachably seated on a shielded outer container holding the material to be filtered so that it may be moved to any container as required, and seated thereon and the filtering performed with the ingredients remaining in a shielded area at all times. In the special circumstances in which a radioactive material is being isolated, a small filtering element containing the filtering material is detachably secured to a conical filter which is mounted in the inner receptacle. This is an important feature as it provides a convenient and safe method for removing the separated radioactive material from the filtering apparatus, which consists in detaching by remote control the element containing the radioactive precipitate and transferring it to a shielded container for further transportation.

It is known that fluid pressure has been used to circulate liquid in percolators, an example of which is illustrated in Patent 1,319,661. These earlier devices are not suitable for filtering operations as entirely different problems are involved which require different structures as illustrated by the following disclosure.

The invention can best be explained by reference to the following description wherein is explained those forms of the invention which have been selected for illustration in the accompanying drawings made a part of this specification.

Figure 1:
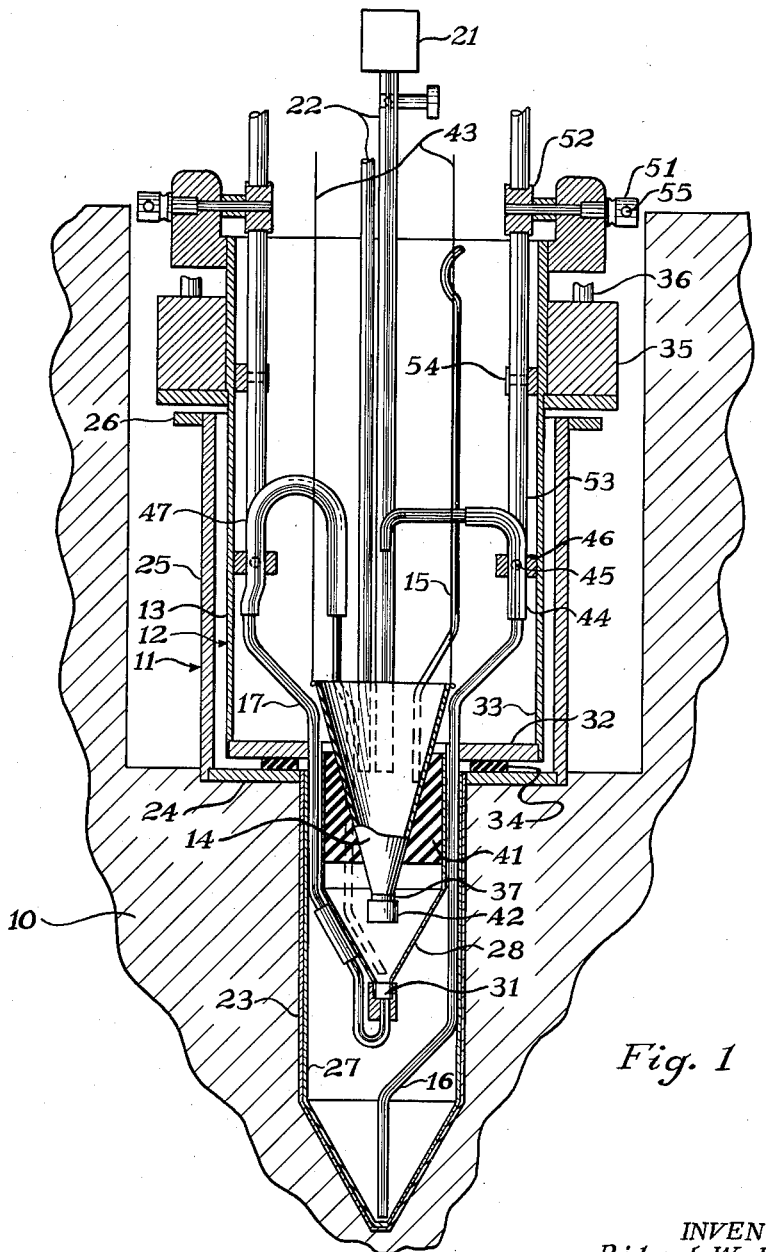
Figure 1 is an elevational view of the apparatus of the invention.

Referring generally to the drawings, the assembled unit comprises an outside shielding receptacle 10 having seated therein the filtering apparatus comprising an outer or shipping container 11 and the filtering unit 12 which, in turn, comprises a filter container 13, a conical filter 14 supported in the filter container, conduits 15, 16 and 17 mounted in the flange of the filter container and one or more ingredient reservoirs 21 with their accompanying conduits 22 also mounted in the flange of the filter container.

Referring specifically to Figure 1 of the drawings, the bottom portion 23 of the outer container 11 of the filtering apparatus has at its top an outwardly-extending annular flange 24 to which is secured an upwardly-extending cylindrical wall 25 having an outwardly-extending annular flange 26 at its top. The annular flange 24 is for seating on the shoulder of a cavity in the shielding receptacle 10. The shielding receptacle is ordinarily made of lead or other radiation-opaque material when a radioactive substance is being filtered. The bottom portion 23 of the outer container 11 is of cylindrical construction with a substantially reduced diameter and has a cone-shaped end. It is preferably made of stainless steel although other suitable material may be used. An insert 27 of platinum, tantalum or other corrosion-resistant material of a shape corresponding to that of the outer container 11 is secured to the inner surface of the bottom portion 23 of the outer container 11 to guard against deterioration.

The bottom portion 28 of the filter container 13 is of cylindrical construction with a cone-shaped end terminating in a tubular-shaped portion 31 and has at its top an outwardly-extending annular flange 32. An upwardly-extending cylindrical wall 33 is secured to the outer rim of flange 32 to form the upper section of the filter container 13.

Flange 32 of filter container 13 is designed to seat on flange 24 of outer container 11 to form a pressure-tight seal with the aid of resilient gasket 34 when the apparatus is assembled. The resilient gasket 34 is secured to the under side of flange 32. To aid in seating, an annular ring 35 of heavy material, such as lead, is secured to the outer surface of wall 33. Lifting hooks 36 may be provided in ring 35 for facilitating the handling of the filtering unit.

A conical filter 14 having a tubular end portion 37 is seated in the filter container 13 to form a pressure-tight seal with the aid of resilient plug 41. A pressure-tight seal is necessary here to effect partial vacuum for removing filtrate from the conical filter 14. If it is desired to position the radioactive material in a certain area of a receptacle after it has been separated, this can be done by using a filter which is dimensioned to do this when it is seated on the receptacle with the radioactive material in the attached filtering element, thus avoiding excessive handling of the radioactive material.

The tubular portion 37 preferably has threads on its exterior surface for receiving a detachable filtering element 42 which is designed to support a filtering material, such as platinum sponge. The conical filter is provided with strings 43, or other similar means, for lifting it free of the inner container.

In order to deliver pressure, above or below ambient, into the outer container 11, conduit 15 is mounted in the flange 32 of the filter container 13. For delivering slurry from the outer container 11 to the filter container 13, a slurry conduit 16 is also mounted in flange 32 of the filter container 13 so that its lower end is adjacent the bottom of outer container 11 and its upper end is in a position to deliver fluid into the filter container 13 when the apparatus is assembled. This conduit consists of two sections of tubing connected with a section of flexible hose 44 which is gated open or closed by the pinching action of cam-actuated plunger 45 mounted in plunger block 46. It is necessary at times to close this conduit to effect partial vacuum in the outer container 11 to remove filtrate from the filter container 13.

In order to transfer filtrate from filter container 13 to outer container 11, a filtrate conduit 17 connects with the lower end of the filter container 13 and passes up through flange 32 into the upper section of the filter container where it is bent in the form of a U and passes back through the flange so that its open end is inside the outer container 11 when the apparatus is assembled. This conduit is also made of tube sections connected by flexible hose 47 to permit opening and closing of the conduit in a manner identical to that described for conduit 16.

The cam device for actuating plungers 45 comprises a handle 51 operatively connected to eccentric 52 which positively engages lever 53 for rotating it about pivot 54 to reciprocate plunger 45 horizontally. The parts of the cam devices for conduits 16 and 17 are of identical construction. One or more ingredient reservoirs 21 are provided for introducing ingredients into the outer container 11 through valved conduits 22. All of the valves and cam devices used in the apparatus are actuated by remote control means which may be of any suitable known type. For example, a long rod having a hook at its end may be used by inserting the hook into the eye 55 in the cam handle 51.

Figure 2:
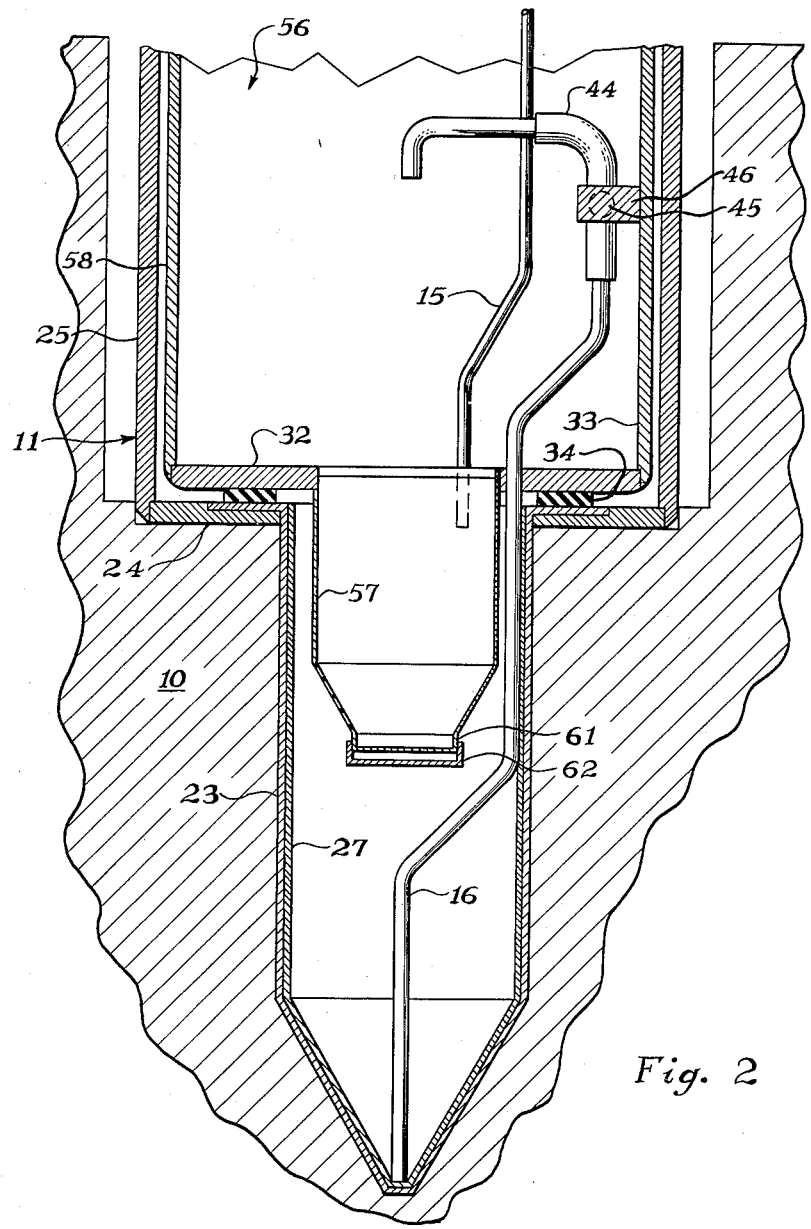
Figure 2 is an elevational view in section of a modification of the apparatus of the invention.

Figure 2 represents a simplified modification of the invention for a first or rough filtering step in which filtrate conduit 17, conical filter 14 and resilient plug 41 of the embodiment of Figure 1 have been omitted. The filtering unit of this modification is represented generally by 56. In this modification, the bottom section 57 of the filter container 58 has been lengthened and the tubular-shaped portion 61 has been given a much larger diameter. The tubular-shaped portion 61 is provided with threads on its exterior for receiving the filtering element 62 which is modified to correspond to the larger diameter of the tubular-shaped portion 61. This modification is useful for performing the first step of a two-step filtration process if the first precipitate is of the type which tends to clog the openings of the filtering material. Due to the large area of the filter opening in this modification, suction may not be required to aid the filtering and because the filtering material used is of a coarse type, it is not unseated by pressure in the outer container. In this use, the conduit 17 of the filtering unit shown in Figure 1 is omitted.

The following description of the separation of radio-lanthanum from radio-barium by means of the apparatus of the present invention is included for the purpose of illustrating the operation thereof, and is in no way intended to limit the scope of the invention.

After receipt of the shipping or outer container 11 holding the chlorides of radio-barium and radio-lanthanum, it is placed in the shielding receptacle 10 at the filtering station by use of a remotely controlled over-head carriage and track arrangement, and the cover (not shown) is removed from the container. Sodium hydroxide solution is then added by means of a long, curved conduit to the contents of the outer container or shipping receptacle 11 to form a precipitate of lanthanum hydroxide. For the first filtering step, the filtering unit 56, shown in Figure 2, is seated on the outer or shipping container by means of remote control apparatus and pressure is admitted through conduit 15 to force slurry through conduit 16 from the shipping receptacle or outer container 11 into the filter container 57. The lanthanum hydroxide precipitate remains on the previously prepared filtering material of platinum sponge in the filtering element 62 and the filtrate containing barium hydroxide passes back into the outer container 11. The coarse-filter unit 56 with its filtering element 62 containing the lanthanum hydroxide precipitate is then removed to another container similar to container 11 containing nitric acid in the bottom portion 23. Alternatively, nitric acid may be introduced in the same manner as the sodium hydroxide. The nitric acid is then circulated through the coarse-filter to dissolve the lanthanum hydroxide. Generally, two or three passes of the acid through the filter are required to completely dissolve the precipitate. After dissolution, the coarse-filter assembly is removed and replaced by the fine-filter unit 12 shown in Figure 1, and this assembly is used to complete the filtering.

Oxalic acid from reservoir 21 is now added to the solution in the outer or shipping container 11 to form a precipitate of lanthanum oxalate and the valve in the reservoir conduit 22 is closed. This salt precipitates quite slowly and, in general, about a half-hour is required to make certain that a quantitative precipitate is obtained. Because the oxalate precipitate forms so slowly in the bottom portion 23, it is often found desirable to agitate the solution. This is accomplished by evacuating through the tube 15 with the clamp 46 open. The evacuation pulls air through the tube 16 and through the solution in the bottom portion 23 to agitate it. This bubbling is also useful in breaking up any precipitate cake which may form about the end of the tube 16 in the bottom portion 23. When precipitation is complete, filtrate conduit 17 is closed by means of cam-actuated plunger 45. With slurry conduit 16 open, pressure is admitted to the shipping container through pressure conduit 15 to force the slurry containing the precipitate of lanthanum oxalate into the conical filter 14. Slurry conduit 16 is then closed and filtrate conduit 17 is opened by means of cam-actuated plunger 45 and partial vacuum is applied through pressure conduit 15. The vacuum is effective to pull all of the filtrate into the outer or shipping container 11 leaving the precipitate of lanthanum oxalate on the sponge platinum filtering material which has been previously arranged in the filtering element 42. The conical filter 14 is then lifted free by means of strings 43. The filtering element 42 holding the lanthanum oxalate precipitate can then be detached from the filter by means of a remote-controlled device and transported in a shielded container to the location where the radioactive material is to be used.

The above described construction and operation of a filtering apparatus which can be operated by remote control and which permits the entire filtering operation to be performed in a shielded area, affords adequate protection for operating personnel. The apparatus also permits separation by remote control of radioactive material without its removal from the shipping container.

While what has been described is believed to be the most advantageous embodiments of the invention, it is evident that various modifications can be made without departing from the purview of the invention. For example, a different type valve, such as a pressure-balanced valve, may be used to admit filtrate into the outer container from the filter container and, if necessary, a bubbler tube may be provided for agitating the contents of the outer container.

Although the present invention has been described in connection with details or specific examples thereof, it is not intended that these shall be regarded as limitations upon the scope of the invention except insofar as included in the following claims.

What is claimed is:

1. Apparatus for isolating small amounts of radioactive material within the container in which it is shipped, comprising in combination, an outer-encasing receptacle of radiation-opaque material, a shipping container seated in said receptacle, a removable filtering unit provided with an outlet and seated concentrically with fluid-tight connection in said shipping container, a first connecting duct communicating with the interior of said shipping container and said filtering unit for delivering slurry from said shipping container to said filtering unit, a second connecting duct communicating with the outlet of said filtering unit and the interior of said shipping container for delivering filtrate from said filtering unit into said shipping container, said second connecting duct being connected to the outlet of said filtering unit in an airtight manner whereby pressure in said shipping container is excluded from said filtering unit, and means for alternately introducing pressure and partial vacuum into said shipping container whereby slurry is forced by pressure from said shipping container into said filtering unit for filtering and filtrate is forced by partial vacuum from said filtering unit into said shipping container for recycling.

2. Apparatus for isolating small amounts of radioactive material within the shipping container by a recycle filtration process, comprising in combination an outer-encasing receptacle of radiation-opaque material, a shipping container seated in said receptacle, a filter container provided with an outlet and seated in said shipping container with fluid-tight connection, a conical filter seated in said filter container having a detachable filtering element secured to its end, a first connecting duct communicating with the interior of said shipping container and said filter container for delivering slurry from said shipping container into said filter container, a second connecting duct communicating with the outlet of said filter container and the interior of said shipping container for delivering filtrate from said filter container to said outer container, said second communicating duct being secured to the outlet of said filter container in an air-tight manner to exclude pressure in said shipping container from said filter container, and means for alternately introducing pressure and partial vacuum in said shipping receptacle whereby slurry is transferred by pressure from said shipping container into said filter container for filtering and filtrate is transferred by partial vacuum in said shipping container from said filter container to said shipping container for recycling.

3. A remote-control filtering apparatus comprising in combination, an outer container with a cylindrical bottom portion having an annular flange extending outwardly from its upper end with an upwardly-extending cylindrical wall attached thereto, a filter container with a cylindrical bottom portion having an outwardly-extending annular flange at its upper end with an upwardly-extending cylindrical wall attached thereto, an annular ring of heavy material attached to the outer surface of the upper cylindrical wall of said filter container, lifting hooks for handling said filter container attached to the upper surface of said annular ring, said filter container being mounted concentrically in said outer container with their flanges seating together in an airtight manner, a conical filter having a detachable filtering element on its end seated in said filter container in an air-tight manner, a first conduit for alternately introducing pressure and partial vacuum into said outer container, a second conduit having a valve therein and communicating with the interior of said outer container and said filter container for delivering slurry from said outer to said filter container, a third conduit having a valve therein and communicating with the outlet of said filter container and the interior of said outer container for delivering filtrate from said filter container to said outer container, said third conduit being secured in an air-tight manner to the outlet of said filter container whereby pressure in said outer container is excluded from said filter container, a plurality of conduits having valves therein for delivering ingredients into said outer container, all of said conduits being mounted in the flange of said filter container and all of said valves being operable by remote-control means; whereby the alternate introduction of pressure or partial vacuum into said outer container is effective to respectively force slurry from said outer to said filter container for filtering and filtrate from said filter container to said outer container for recycling.

References Cited in the file of this patent

UNITED STATES PATENTS 2,347,322     Jackson _____ Apr. 25, 1944